Oct. 6, 1964  V. H. ASKE  3,152,275

TORQUING APPARATUS

Filed Aug. 29, 1960

INVENTOR.
VERNON H. ASKE
BY
Roger W. Jensen
ATTORNEY

United States Patent Office 3,152,275
Patented Oct. 6, 1964

3,152,275
TORQUING APPARATUS
Vernon H. Aske, Hopkins, Minn., assignor to Honeywell Inc., a corporation of Delaware
Filed Aug. 29, 1960, Ser. No. 52,522
6 Claims. (Cl. 310—266)

This invention pertains to magnetic torquers and, more specifically, to a higher linear torque generating device in which a coil is rotatably suspended between a magnetic core and a concentric spacer of magnetic material.

An example of a prior art magnetic torquer is disclosed in an application by Stephen L. Burgwin, Serial No. 593,568, filed on June 25, 1956, now Patent No. 3,076,111, and assigned to the same assignee as the present application.

The Burgwin type of magnetic torquer includes a stator made of a permanent magnet core with a plurality of radially projecting poles and a concentric magnetic ring so disposed that a plurality of symmetrical air gaps are defined. A non-magnetic sleeve is attached to one end of a hollow gimbal by some suitable means, for example potting, and the entire assembly of the gimbal and the sleeve is then rotatably mounted by pivots and jewels for rotation relative to a hollow housing. The gimbal assembly is floated by being surrounded by a viscous fluid which has a density substantially equal to the density of the gimbal assembly. The rotational support of the gimbal assembly is such that the sleeve is rotatable and concentric in the air gaps. A plurality of generally rectangular windings contained in the sleeve and conforming with the outer shape are electrically connected together and have suitable terminal means by which an electric current may be applied thereto. The portions of the windings which are parallel to the axis of rotation of the gimbal and sleeve assembly are centered over the poles of the magnet, and the gimbal assembly is restricted in a rotational sense to a limited range of angular movement away from its normal of null position so that the parallel winding portions remain substantially centered over the poles.

Magnetic flux is set up in the air gaps between the pole projections of the magnet and the concentric ring of magnetic material. Since the portions of the windings in the sleeve which are parallel to the axis of rotation are substantially in the center of this field, if a current is passed through the windings a net torque will be produced on the sleeve which is directly proportional to the amount of current passing through the windings. Any portions of the windings concentric with the axis of rotation will not produce a useful torque. It can be seen that the concentric portions of the windings only add resistance to the circuit and, therefore, it is desirable to make these portions as small as possible. Since only the portions of the windings parallel with the axis of rotation of the sleeve produce any useful torque previous teachings have made them as long as it is physically practical to make them. It was taught that by doing this a larger portion of the flux would be encircled by the winding and more torque would be produced.

The major problem in the prior art device is a change of scale factor with relative axial movement between the stationary and rotatable parts of the torquer. Scale factor is defined as the integral of flux density over the effective coil length times this length. Such relative axial movement can occur in a floated instrument when the instrument is inverted end for end or during an axial acceleration due to the fact that the gimbal is not perfectly floated. That is, the amount of torque produced for a certain amount of current flowing in the windings is different in one position than it is in another. This is highly undesirable since most magnetic torquers are designed to be used in equipment which will be moving and relative axial movement is apt to take place.

After much experimentation it was found that this change in scale factor was due to an axial movement of the sleeve carrying the torque producing windings relative to the core structure. 1 or 2 milliinches had to be left between the thrust bearings and pivots on either end of the gimbal and sleeve assembly or the friction would become too great and to allow for differential temperature expansion. Theoretically if the density of the sleeve and gimbal assembly and the liquid in which it is floated were exactly equal the assembly would not move in relation to the stationary parts when the torquer was inverted end for end or acceleration applied thereto. However, it is impractical if not impossible to obtain a liquid with exactly equal density. Therefore some movement does occur.

As is well known, the flux density in a small air gap, such as the one in the Burgwin example, is constant for the width of the magnet and slopes off sharply beyond the outer edges of the magnet. Finally the slope becomes less sharp and the flux density approaches zero asymptotically. In previous torquers the portions of the windings parallel with the axis of rotation were made at least as long in the axial direction as the magnets and in many cases were substantially longer. Thus, those portions of the windings extend out into the sharply sloping flux density areas. Any axial movement of the windings would cause these portions of the winding to extend farther out on one axial end of the air gap and less on the opposite end, therefore, because of the sharp slope, it could enclose a considerable different amount of flux. Thus, a change in scale factor occurs.

In the present invention the portions of the windings parallel to the axial rotation of the sleeve are substantially shorter in the axial direction than the magnets. These portions are also positioned between the two axial ends of the poles. Thus the parallel portions of the windings are well within the flat or constant density portion of the flux. Since they are substantially within the constant density portion any expected movement of the rotor in the axial direction will not move them out into the sharply sloping portion of the flux density. Thus they will cut the same amount of flux in all rotational positions of the torquer and the scale factor will remain constant. The importance of the present invention will be appreciated from the finding that the scale factor error in the previous art has been reduced by a power of ten with the present teaching.

An object of the invention is to provide an improved control apparatus.

Another object of the invention is to provide improved magnetic torquers.

Another object of this invention is to produce a linear torque output in a floated gimbal, magnetic torquer regardless of the position of the magnetic torquer in space.

These and other objects will become apparent when the following specification is considered with the single sheet of drawings wherein.

Figure 1:
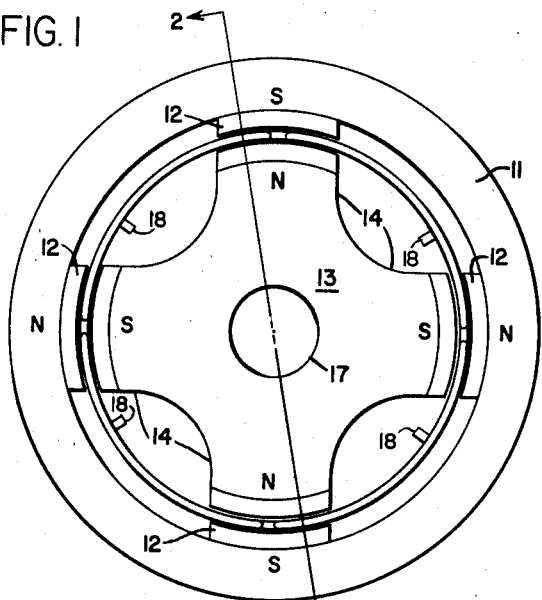
FIGURE 1 is an elevation of the torquer.

Referring to FIGURE 1 an annular ring 11 is provided and is made of some magnetic material. The ring 11 may be ferromagnetic or, as in this example of the preferred configuration, it may be a permanent magnet.

The annular ring 11 has a plurality of pole projections 12 which are made of some magnetic material for example soft iron and are curved to conform to the surface of ring 11. As shown in FIGURE 1, four poles 12 are provided and are arranged equi-angularly about the inside diameter of ring 11.

Mounted concentrically within ring 11 is a permanent magnet core 13. Both ring 11 and core 13 should be solidly mounted by some appropriate means, not shown, to an outside case, also not shown, and in a manner such that the north and south poles alternate in each member and a south pole on the ring lines up with a north pole on the core so that the magnetic flux aids.

The permanent magnet core 13 has four equi-angularly spaced poles 14 which have pole faces 15. Pole faces 15 are curved to conform to the radius of ring 11 and are made of some magnetic material such as soft iron. Core 13 and ring 11 are mounted so that the pole faces 15 are in register with the pole projections 12, thus defining therebetween four air gaps 16. It will be understood that a field of uniform magnetic flux density will be produced throughout the air gaps 16, the soft iron members 12 and 15 serving this function. Reference numeral 17 refers to a central aperture or hole in core 13.

Figure 2:
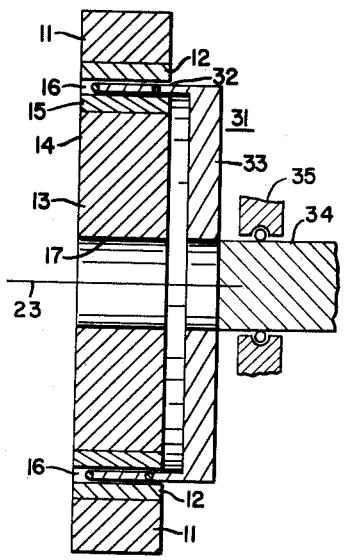
FIGURE 2 is a cross-section of the torquer as viewed along lines 2—2 of FIGURE 1.
Figure 3:
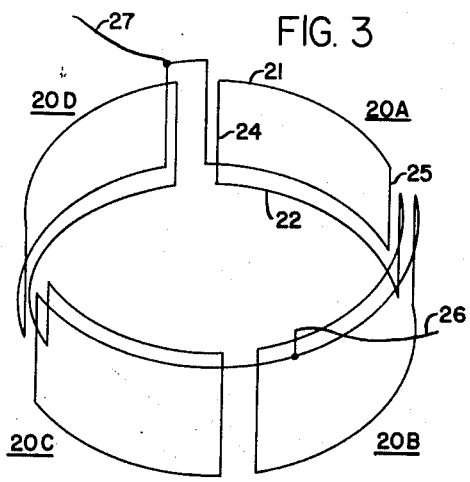
FIGURE 3 is a schematic representation of the energizing coil of the device.

FIGURE 3 is a schematic wiring diagram of winding 20 which is made up of four coils 20A, 20B, 20C, and 20D. Since all four coils are substantially the same, coil 20A will be used as an example. The coil 20A is generally rectangular and has two opposite sides 21 and 22 which are concentric with the axis of rotation 23, shown in FIGURE 2. The other two sides 24 and 25 of coil 20A are parallel to the axis of rotation 23. 26 and 27 are connecting means by which a current may be applied to winding 20.

FIGURE 2 is a sectional view of FIGURE 1 as viewed along line 2—2. A cup 31 is provided and comprises a sleeve portion 32, which contains coils 20A, 20B, 20C, and 20D disposed in the fashion shown in FIGURE 3, and a flat end portion 33. The sleeve portion 32 and the flat end portion 33 may be one integral unit, as shown, and end portion 33 connected to a gimbal, not shown, by some convenient means such as a shaft 34 rotatably mounted by bearings 35, or the sleeve portion 32 may be made up of coils 20A, 20B, 20C, and 20D prewound and potted, and connected directly to a gimbal by some convenient means such as potting. In this case end portion 33 would represent the actual gimbal. The gimbal would be supported for rotation about the axis of rotation 23 by suitable means such as a pivot and jewel on each end either of which could be connected to a stationary housing, not shown, and the entire assembly, gimbal and cup 31, would be floated in some suitable viscous liquid of approximately the same density. It should be noted that these two methods of attaching the sleeve portion 32 of cup 31 to the gimbal are only two examples and many other may be devised. In FIGURE 1 four stops 18 are shown attached to the inside periphery of the cup 31 and serve to limit the rotation of the cup. The stops are shown located in a manner to maintain the coil sides centered between the magnetic pole faces. However, in actual practice the device attached to the cup 31 would be included in a servo loop which would maintain the cup substantially in the position shown.

Figure 4:
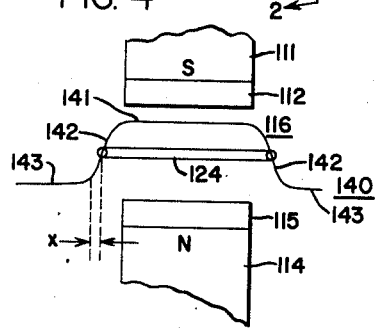
FIGURE 4 is a curve of the flux density in the air gap showing the coils of the prior art.
Figure 5:
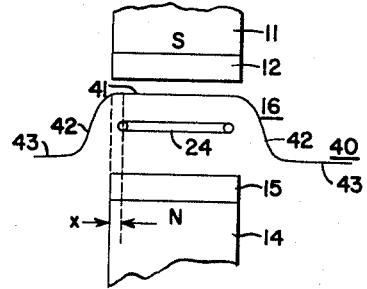
FIGURE 5 is a curve of the flux density in the air gap showing the coils in the present invention.

FIGURES 4 and 5 are basically figures of the flux density distribution in an air gap and will be used to explain the theory involved in the present invention. For convenience the same numbering system will be used as in the other figures, except the numbers of FIGURE 4 will have a "1" in front of them to denote them as pertaining to the prior art type of device, although the curves are typical of any magnetic field in air gaps such as 16 in FIGURE 2.

In FIGURE 4, 111 is a magnet which for simplicity has only a south pole. It should be understood that this is only a part of a larger assembly such as ring 11 in FIGURE 2. Magnet 111 has a soft iron pole face 112 to insure uniform flux density. 114 is a magnet which for simplicity has only a north pole. It should be understood that this is only a part of a larger assembly such as core 13 in FIGURE 2. Magnet 114 has a soft iron pole face 115 to insure uniform flux density. 116 is the air gap formed by pole face 112 and pole face 115. 140 is a graphical representation of the flux density. Portion 141 of the curve 140 shows a maximum, uniform flux density in the air gap 116 and extending approximately to the outside or axial edges of pole face 112 and pole face 115. Portions 142 of curve 140 show a sharply decreasing flux density immediately outside of the air gap 116 and portions 143 of curve 140 show a flux density that asymptotically approaches zero. 124 is a portion of a current carrying coil similar to portion 24 of coil 20A in FIGURE 3, except that portion 124 extends axially outside of the air gap 116 at both ends as was the case in prior art devices.

Assuming a complete magnetic circuit between magnet 111 and magnet 114, so that a field of flux will be set up in air gap 116 conforming to the flux density curve 140, and current producing means attached to coil portion 124 in some manner to make a complete electrical circuit, a force will be produced on coil portion 124 which will be directly proportional to the amount of current flowing through it. The force will also be directly proportional to the amount of flux enclosed by the coil portion 124. The summation of this enclosed flux is commonly known as the scale factor and may be obtained mathematically by integration or in other words by finding the area beneath curve 140 and within the length of coil portion 124. In FIGURE 4 if a vertical line were drawn through the ends of the coil portion 124 and a horizontal line were drawn substantially below portion 143 of curve 140 which would represent zero flux density the area enclosed by these lines and curve 140 would be the scale factor.

It should be noted that the same theory can be applied to portions 24, 25 and all other portions of coils 20A, 20B, 20C, and 20D parallel to the axis of rotation 23. Each of these coil portions will have a force produced on it. All of these forces will add to produce a net force which will in turn cause a net torque on sleeve 32. This net torque on sleeve 32 is transmitted to the gimbal since they are connected solidly together.

A cup assembly 31 having sleeve 32 in which windings 20A, 20B, 20C, and 20D are potted is connected by some means to a gimbal which is suspended by a pivot and jewel on either end and floated in a liquid of approximately the same density. Because of machining, friction limitations and a differential temperature expansion a substantial distance must be allowed between the pivot and jewel on either end of the gimbal. Theoretically if the liquid in which the gimbal assembly is floated has exactly the same density no movement will occur when the torquer is inverted axially or an acceleration occurs along the axis or rotation 23, but since equal densities are impossible or at least impractical a movement does occur. This movement will be parallel with the axis of rotation 23 and in practical cases is in the range of 1 or 2 milli-inches. In FIGURE 4 a distance X has been designated to correspond with the axial movement.

In FIGURE 4 if coil portion 124 moves a distance X it can be proven that the scale factor will change. This is not readily apparent even to one skilled in the art, since the curve is symmetrical and it appears that any area lost at one end of the coil by axial movement would be gained at the other end. However, it can be proven by integration that the area under the curve changes with axial movement of the coil, and, therefore, the scale factor changes. This means that the force on coil portion 124 would change and a different amount of force would be produced for a fixed amount of current applied to coil portion 124. Thus an error will occur. If this reasoning is applied to the magnetic torquer each coil portion 24, 25 and all other potrions of coils 20A, 20B, 20C, and 20D, parallel to the axis of rotation 23 will have an error in force when the gimbal and attached cup 31 move axially along 23. Since each of these errors in force add, the final error in net force and, hence, the final error in the net torque on the sleeve 32 will be large.

FIGURE 5 is the same as FIGURE 4 except that coil portion 24 has been reduced in length. The reduction in length is such that even when coil portion 24 moves a distance X the ends still remain within the constant flux density region designated graphically by portion 41 of curve 40. Thus even though coil portion 24 moves a distance X the scale factor remains constant and, therefore the force on coil portion 24 remains constant and the error is greatly reduced.

If this reasoning is applied to portions 24, 25 and all other portions of coils 20A, 20B, 20C, and 20D which are parallel to the axis of rotation 23 it can be seen that since the error in the force on each coil portion such as 24 which is parallel to the axis of rotation 23 is greatly reduced the addition of all these errors will be greatly reduced and the error in the net torque on sleeve 32 will be greatly reduced.

It is apparent from this disclosure that this invention has greatly improved linearity in magnetic torquers. It should be kept in mind that this preferred embodiment is intended to be an example only and many modifications would be apparent to one skilled in the art. Consequently, the subject invention should be limited only by the appended claims.

I claim as my invention:

1. A torque generator comprising a multi-pole permanent magnet member symmetrical about a central axis, said poles being radially disposed about said axis; a ring member of magnetic material spaced from and concentric with said magnet member, one of said members having a plurality of radially projecting pole portions; a sleeve of nonmagnetic material disposed between said members and concentric therewith; a plurality of generally rectangular series-connecting coils carried by said sleeve and conforming with the outer surface of said sleeve, said coils being equally spaced about said sleeve, each said coil being so disposed that each pair of adjacent coil sides parallel to said axis is substantially centered over a pole portion, and each said parallel coil side being substantially shorter axially than said pole portions; means for mounting said sleeve for limited rotation such that each pair of adjacent coil sides remains at all times substantially centered over its associated pole portion; means for conducting electrical currents through said coils; and means for transmitting torque from said sleeve.

2. A torque generator comprising a multi-pole magnet member symmetrical about a central axis, said poles being radially disposed about said axis; means for producing flux in said poles; a ring member of magnetic material spaced from and concentric with said magnet member, one of said members having a plurality of radially projecting pole portions; a sleeve of nonmagnetic material disposed between said members and means for mounting said sleeve concentrically and for limited rotation relative to said members; a plurality of generally rectangular electrically connected coils carried by said sleeve and conforming with the outer surface of said sleeve, each said coil being so disposed that each pair of adjacent coil sides parallel to said axis is substantially centered over a pole portion, and each said parallel coil side being substantially shorter axially than said pole portions; means for conducting electrical currents through said coils; and means for transmitting torque from said sleeve.

3. A torque generator comprising a multi-pole permanent magnet member symmetrical about a central axis, said poles being radially disposed about said axis; a ring member of magnetic material spaced from and concentric with said magnet member, one of said members having a plurality of radially projecting pole portions; a rotatable sleeve concentrically mounted between said members; a plurality of generally rectangular coils carried by said sleeve and conforming with the outer surface of said sleeve, each said coil being so disposed that each pair of adjacent coil sides parallel to said axis is substantially centered over a pole portion, and each said coil side parallel to said axis being substantially shorter axially than said pole portions; means for conducting electrical currents through said coils; and means for transmitting torque from said sleeve.

4. A torque generator comprising a multi-pole permanent magnet symmetrical about a central axis, said poles being radially disposed about said axis, a ring of magnetic material spaced from and concentric with said magnet, a sleeve of nonmagnetic material disposed between said magnet and ring and concentric therewith, a plurality of generally rectangular series-connected coils attached to and conforming with the outer surface of said sleeve, said coils being equally spaced about said sleeve, each said coil being so disposed that each pair of adjacent coil sides parallel to said axis is substantially centered over a pole of said magnet, each of said coil sides parallel to said axis being substantially shorter axially than said pole of said magnet, means for mounting said sleeve for limited rotation such that each pair of adjacent coil sides remains at all times substantially centered over its associated magnet pole, means for conducting electrical currents through said coils and means for transmitting torque from said sleeve.

5. A torque generator comprising a multi-pole permanent magnet symmetrical about a central axis, said poles being radially disposed about said axis, a ring of magnetic material spaced from and concentric with said magnet, a sleeve of nonmagnetic material disposed between said magnet and ring and concentric therewith, a plurality of generally rectangular series-connected coils carried by said sleeve and conforming with the outer surface of said sleeve, said coils being equally spaced about said sleeve, each said coil being so disposed that each pair of adjacent coil sides parallel to said axis is substantially centered over a pole of said magnet, each pair of adjacent coil sides parallel to said axis being substantially shorter axially than said poles of said magnets, means for mounting said sleeve for limited rotation such that each pair of adjacent coil sides remains at all times substantially centered over its associated magnet pole, means for conducting electrical currents through said coils and means for transmitting torque from said sleeve.

6. A torque generator comprising a first permanent magnet member and a ring-shaped permanent magnet member, said members being symmetrical about a central axis, at least one of said members having a plurality of radially projecting pole portions, and said members being concentrically positioned; a sleeve of nonmagnetic material disposed between said members and concentric therewith; a plurality of generally rectangular electrically connected coils carried by said sleeve and conforming with the outer surface of said sleeve, each said coil being so disposed that each pair of adjacent coil sides parallel to said axis is substantially centered over a pole portion, and each pair of adjacent coil sides parallel to said axis being substantially shorter axially than said pole portion; means for mounting said sleeve for limited rotation such that each pair of adjacent coil sides remains at all times substantially centered over its associated pole portion; means for conducting electrical currents through said coils; and means for transmitting torque from said sleeve.

References Cited in the file of this patent

UNITED STATES PATENTS

| 2,435,487 | Adler | Feb. 3, 1948 |
| 2,932,751 | Crocker et al. | Apr. 12, 1960 |

FOREIGN PATENTS

| 1,006,640 | France | Jan. 30, 1952 |